(12) United States Patent
Trell

(10) Patent No.: US 9,232,033 B2
(45) Date of Patent: Jan. 5, 2016

(54) ATTACHABLE MOBILE PHONE KEYPAD DEVICE

(71) Applicant: Anders Edvard Trell, Stockholm (SE)

(72) Inventor: Anders Edvard Trell, Stockholm (SE)

( * ) Notice: Subject to any disclaimer, the term of this patent is extended or adjusted under 35 U.S.C. 154(b) by 0 days.

(21) Appl. No.: 14/185,577

(22) Filed: Feb. 20, 2014

(65) Prior Publication Data

US 2014/0235302 A1 Aug. 21, 2014

Related U.S. Application Data

(60) Provisional application No. 61/850,572, filed on Feb. 20, 2013.

(51) Int. Cl.
*H04M 1/02* (2006.01)
*H04M 1/725* (2006.01)
*H04M 1/23* (2006.01)

(52) U.S. Cl.
CPC ........ *H04M 1/0254* (2013.01); *H04M 1/72575* (2013.01); *H04M 1/236* (2013.01)

(58) Field of Classification Search
CPC   H04M 1/0254; H04M 1/236; H04M 1/72575
USPC .................................. 455/575.1, 566, 550.1
See application file for complete search history.

(56) References Cited

U.S. PATENT DOCUMENTS

| | | | |
|---|---|---|---|
| 7,768,605 B2 | 8/2010 | Polak | |
| 2004/0023696 A1* | 2/2004 | Kim | 455/566 |
| 2004/0198307 A1* | 10/2004 | Chang | 455/348 |
| 2006/0097983 A1* | 5/2006 | Haggman et al. | 345/156 |
| 2011/0188176 A1* | 8/2011 | Kim | 361/679.01 |
| 2013/0222208 A1 | 8/2013 | Gorilovsky et al. | |

* cited by examiner

*Primary Examiner* — Barbar Sarwar
(74) *Attorney, Agent, or Firm* — Jacobson Holman, PLLC.

(57) ABSTRACT

The present invention includes a telephone keypad adapted to be mounted to a back surface of a mobile telephone, a mobile telephone including such keypad. The keypad includes a plurality of alphanumerical keys adapted for allowing text entry into the mobile telephone; and an attachment part for mounting the keypad to the mobile telephone.

17 Claims, 1 Drawing Sheet

ATTACHABLE MOBILE PHONE KEYPAD DEVICE

TECHNICAL FIELD OF THE INVENTION

This invention pertains in general to mobile telephones ("mobile[s]"); and more particularly, to the portion of a mobile that facilitates manual alphanumerical entry into the mobile for a user, namely a "keypad".

BACKGROUND OF THE INVENTION

Mobiles typically incorporate a keypad, traditionally a particular and "physical" one of a very standardized layout, a 3×4 grid; but with the advent and swift acceptance of so called smartphones, now commonly integrated into sames' sole screen and thereon enacted by a user by light finger or "pen" touches.

This may be viewed as a disadvantage—by some missing the habitual tactility and acquired expertness at the physical keys and by some for its encroaching on the screen area—and visually impaired are disfavored; an active smartphone screen takes lot of battery etc.; and which all gives incentive for this invention.

While thus the sole functional visual user interface at common smartphones tends to be by some regarded as compromised or overcrowded by too many concurring elements, their backside remains virtually empty. Some ways of their assisting have been presented; for so called back-to-back displays in e.g. U.S. Pat. No. 7,768,605 for so called flip-up 'feature' phones (as contrasting to 'smart'); and for smartphone types in US 2013/0222208 A1; this latter also discussing a back-to-back touch keypad (at paragraphs [0061-63], [0073], [0147], [0242-49]).

Existing solutions for mobile phones back-to-back displays/keypads are thus integrated into the phones and brand specific, which for users who just want such features occasionally and on their usual own smartphone may tend to be regarded as limiting and also expensive. Also, re keypads, they are so far not "physical" and as regards capacitive touch ones, they always need and consume much electric power for appearing/enactment, whereas physical keypads always are at hand (although switch-off-able) and just need negligible electric power for enactment.

To personalize and protect smartphones, a considerable market for and variety of so called cases/covers has emerged. The best reference to them that at the time of this application can be given is here thought to be at a site such as e.g. www.cellphoneshop.net/snapcover. It is there seen that being virtually identical, their main difference lies in which particular smartphone they are designed for, i.e. dimensional properties in order to fit and snap-on perfectly their host phone. Since even within same brand of smartphones measurements often change with new models, it is seen that a cover soon may become outdated and therefore should be kept quite cheap to facilitate change. From a technical point of view, though, they don't change. Their back, following and covering the smartphone's back, mostly just carries some decorative/ornamental art and is for the rest just a plastic sheet and can be varied in gauge and also hollowed without affecting the phone.

OBJECT OF THE INVENTION

It is the object of this invention to solve problems as above as well as rendering some new and advantageous features, by providing an attachable, "physical", standard and functional keypad to esp. smartphones (and possibly other types of phones): and then occupying their backside, hitherto mostly left blank.

SUMMARY OF THE INVENTION

The present invention disclosed and claimed herein comprises an attachable physical, operational standard mobile phone keypad device being mounted into a standard attach-removable backside cover-piece or similar of a mobile, esp. a smartphone. Text entry etc. at the keypad device, when attached and activated, is downloaded into the smartphone via a provided, preferably physical link over which also power to the keypad device can flow. A few rows' running along text display and some other devices can be provided the keypad device.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE INVENTION

Figure 1:
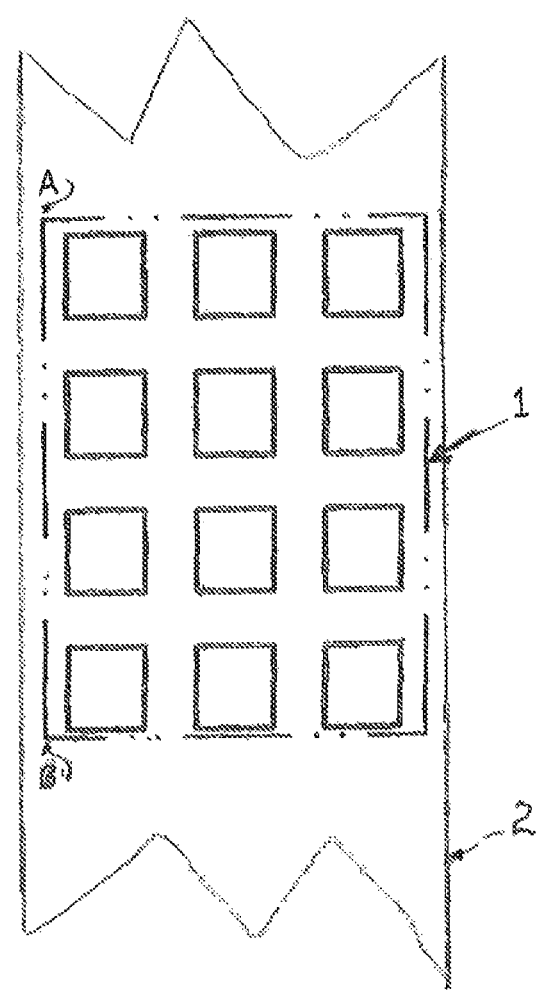
FIG. 1 illustrates an overall schematic top view of the present invention.

Referring now to FIG. 1, there is illustrated a schematic top view of a preferred embodiment of the present invention. A keypad 1 is disposed with keys pointing outward on the backside of a so called mobile case 2 (or, alternatively, a replacement copy of the actual mobile's own envelope's, for battery, SIM-card etc. placing, detachable backside or open-able part thereof), of which is shown a pertinent sector (instead of a full backside case, a "saddle" version, just snapping or strapping on enough stretch "amidships", is also possible).

Mobile accessories/fittings, cases are very common. They either cover the back and sides of the mobile, leaving the screen free, or totally cover. In which case the screen covering part should be transparent for viewing and allowing e.g. capacitive touch through for handling (without taking out the mobile). They are decorative and protective but not technically functional, but for a few that may contain features like solar cell charging, extra big battery size, credit card holder; and where camera lens etc. are on the mobile, they have corresponding holes.

As mentioned above, backsides of such cases/covers can be customized as to gauge and hollows, retaining their clip/snap-on/off ability. In a separate preferred embodiment, they are herein utilized as freely attach/removable holders for a keypad (possibly with display) module according to the present invention. These covers are quite cheap and thus reasonably dispensable, whereas a keypad module according to the invention, although quite ordinary and uncomplicated nevertheless due to its special parts and technical effectiveness needs to be more expensive. So buying a new just for each smartphone dimensional change would be unreasonable, esp. since it's intended to work the same with all smartphones.

Instead, it is advantageously constructed as a uniform preferably rectangular and quite thin module carrying physical keys (and possibly a minor text display). Today's mobile phone keypads (and displays), whether physical or virtual, keys or membrane, capacitive or resistive etc., are due to the tight component stacking in the phones, ordinarily built very thin and so to here nearer relate for how to build such a thin module is thought needless, since belonging to prior art knowledge.

Now, all pertaining covers can be made, each partly having right measures for its intended host smartphone model and each partly at its back having a uniform dimension hollow/gauge for as long as intended holding a (keys/display outward) module and thus, when model change calls for cover change the module can follow into the new one and functioning, programs, routines etc. can be retained.

The module is retrievably affixed into the hollow possibly so deep through the matching gauge sheet that its own backside touches that of the smartphone; and one such way could be by provisional hinges and an opposite clasp. Referring to FIG. 1, hinging it along axis a-b can facilitate also that the keypad can be folded out to siding with and so writing into the main smartphone screen. (In case the keypad is of the by smartphones usually reduced QWERTY type and hinged with its numerical key row nearest to mentioned axis, it too can be folded out to write into the main screen, the smartphone then being held in the landscape position.)

The keypad 1 is shown in "portrait" mode as a standard 3×4 grid one, but other layouts are possible but not considered advantageous, because not so habituated to in mobile phones (for "landscape" mode, a QWERTY type could be possible; is included in the inventive thought (as are other possible layouts) and shares in most herein disclosed technical features, but is not separately herein much discussed or shown).

The individual keys should preferably be of like size with each other, square and sized up to almost touching each other; the drawing doesn't specifically show this, nor should any deviances escape out of the inventive thought.

Neither does the drawing show any numbering etc. on the keys, preferably the ordinary mobile standard should be employed, but there might be good cause for other; and of course a changeable electronic display may be applied to them each.

The preferred way to handle this 3×4 keypad here is namely upside-down, i.e. based on tactile experience rather than sight; and in such a case the standard numbering would become mirrored. However, input can (in write mode) always be seen in realtime at an upward and activated smartphone screen and as said, experience will help. Since in this case not seen, fixed numbering can remain, but still and if wanted, the actual numbering order could be reversed in this position.

The keypad can also be enacted face up and in such a case, standard numbering would come right and would a few rows' running and correctable text display, possibly in e-ink for energy saving, incorporated in the invented device but not shown in the drawing, be of good assistance. The ready text can be streamed into the memory of the mobile whose own screen can be off, saving lot of battery. (If of type QWERTY, face up—with display—position would come most natural)

So the multi-tap text entry as well as some "chordic" methods (e.g. as in U.S. Pat. No. 6,909,382) can be applied, in a very energy saving way, since the host mobile's screen can remain off; and an on device of the invention is very chary.

It's thought that the best and most ergonomic way of one hand handling the mobile when in keys-down position, would be to hold it with thumb and little finger (+ring-finger), on the lower sides respectively and tapping the keys with the three (or two) other fingers.

Since the cases etc. must suit just "their" intended mobile model, they will dimensionally differ slightly and could be designed to facilitate such holding and tapping, but are just exchangeable molds. The embedded keypad, however, can technically and dimensionally remain same and together with other technical features form a module to freely move into next case/backside (having a fitting hollow) which might be chosen. The next case/backside will thus be given both the invention's technical as well as decorative/protective properties at lower cost.

Figure 2:
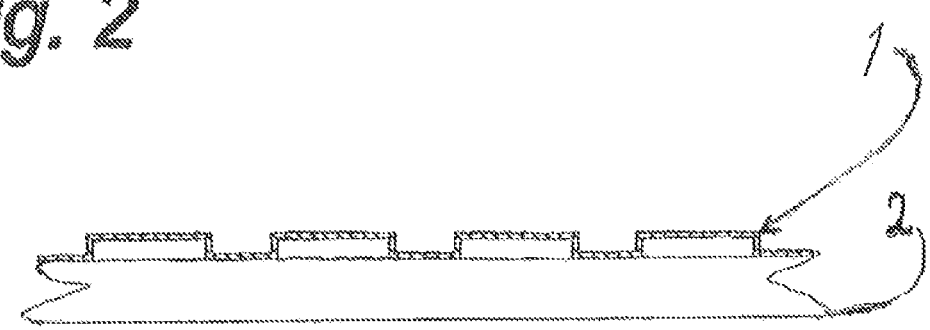
FIG. 2 shows schematically a section through a key column of the invention.

As stated, tactility of the keypad is viewed important and FIG. 2 shows this by a section through a key column and which, as with FIG. 1, isn't intended to show any proportionality, but just illustrates the slight rises that give tactility and feedback. Nor is shown any functionality; there are a lot of known ways to bring about a suited key action. Instead of elevated "keys", tactile orientation could be aided by demarcating ridges and/or furrows and can the keys be flat (touch/membrane).

Apart from a simple display, things like a "navigator", on-button etc. may be incorporated but too many things would unnecessarily jam the available surface.

Since primarily intended for use with a smartphone, most of suited program, instructions etc. could be provided/administered from and by the smartphone by means of an "App" or so. Also needed power can be likewise delivered as well as upload from the invented device, via a micro-USB or similar corded connection per such an outlet at the invented device (Bluetooth or like could also work, but is here deemed disadvantageous, although included in the inventive thought), which itself wouldn't need much computer strength; some memory, some drivers for keypad, possible display, navigator. etc.

It is thought that this keypad per attachment concept is advantageous in many ways. To start with, it may not immediately appeal to all, so it's not believed that many smartphones will be manufactured with backside keypad etc. on, since it will make them more expensive for those who wouldn't want such features (and when model changes keypad hardly can follow over). It will start like a fringe market, but seeing the vast number of smartphones, even a fringe market is big, with increase potential. For those who want it, cost will not be big and old smartphones can be upgraded. By being sunken into the case/backside and keeping keys low, thickness should not be overly increased but could add a "bumper" effect to the protective properties of the case.

They can also work stand alone and with other hosts/clients than just smartphones. Via the preferred USB socket, also surfpads, PC:s etc. can be similarly served, also if the invented device sometimes remains on its smartphone.

The invention claimed is:

1. A mobile telephone keypad configured to be attachably or removably mounted to or embedded into a back surface of an exchangeable cover or case of a mobile telephone, the mobile telephone keypad comprising:
   a plurality of alphanumerical keys configured for allowing text entry into the mobile telephone; and
   an attachment means formed by said cover or case for removably mounting the mobile telephone keypad to said cover or case;
   such that the keys are openly directed outwards when the mobile telephone keypad is mounted to or embedded into the backside of the cover or case of said mobile telephone when the cover or case is affixed to the mobile telephone, and the keys of the mobile telephone keypad facing same side as display or screen of the mobile telephone when folded over towards the side of the mobile telephone;
   wherein the attachment means comprises gauge and hollows to facilitate a said mounting into the said cover or case.

2. The mobile telephone keypad according to claim 1, wherein keys are elevated with respect to a surface of the mobile telephone keypad.

3. The mobile telephone keypad according to claim 1, wherein the attachment means comprises at least one hinge and an opposite clasp.

4. The mobile telephone keypad according to claim 1, wherein the mobile telephone keypad is foldable with respect to the mobile telephone.

5. The mobile telephone keypad according to claim 1, comprising a micro-USB or similar corded connection to the mobile telephone.

6. The mobile telephone keypad according to claim 1, wherein the mobile telephone keypad further comprises a text display.

7. The mobile telephone keypad according to claim 6, wherein the text display is a correctable text display in e-ink.

8. The mobile telephone keypad according to claim 1, wherein the shape is generally rectangular.

9. A mobile telephone comprising a front face and a removable back face having a mobile telephone keypad so entry on the mobile telephone keypad can be shown on the front face, wherein the mobile telephone keypad is attachably or removably mounted to or embedded into the back face of an exchangeable cover or case of the mobile telephone, the mobile telephone keypad comprising:
- a plurality of alphanumerical keys configured for allowing text entry into the mobile telephone; and
- an attachment means formed by said cover or case for removably mounting the mobile telephone keypad to said cover or case;
    - such that the keys are openly directed outwards when the mobile telephone keypad is mounted to or embedded into the backside of the cover or case of said mobile telephone when the cover or case is affixed to the mobile telephone, and the keys of the mobile telephone keypad facing same side as display or screen of the mobile telephone when folded over towards the side of the mobile telephone;
        - wherein the attachment means comprises gauge and hollows to facilitate a said mounting into the said cover or case.

10. The mobile telephone according to claim 9, wherein keys are elevated with respect to a surface of the keypad.

11. The mobile telephone according to claim 9, wherein the attachment means comprises gauge and hollows to facilitate attachment to the mobile telephone.

12. The mobile telephone according to claim 9, wherein the attachment means comprises a hinge and an opposite clasp.

13. The mobile telephone according to claim 9, wherein the keypad is foldable with respect to the mobile telephone.

14. The mobile telephone according to claim 9, wherein the keypad comprises a micro-USB or similar corded connection to the mobile telephone.

15. The mobile telephone according to claim 9, wherein keypad further comprises a text display.

16. The mobile telephone according to claim 15, wherein the text display is a correctable text display in e-ink.

17. A mobile telephone keypad configured to be attachably or removably mounted to or embedded into a back surface of an exchangeable cover or case of a mobile telephone, the mobile telephone keypad comprising:
- a plurality of alphanumerical keys configured for allowing text entry into the mobile telephone;
    - a micro-USB or a corded connection to the mobile telephone; and
- an attachment means formed by said cover or case for removably mounting the mobile telephone keypad to the mobile telephone;
- such that the keys are openly directed outwards when the mobile telephone keypad is mounted to or embedded into the backside of the cover or case of said mobile telephone, and the keys of the mobile telephone keypad face same side as display or screen of the mobile phone;
    - wherein the mobile telephone keypad is foldable with respect to the mobile telephone;
    - wherein the attachment means comprises gauge and hollows to facilitate attachment to the mobile telephone; and
    - wherein the attachment means comprises at least one hinge and an opposite clasp; and
- wherein keys are elevated with respect to a surface of the mobile telephone keypad.

* * * * *

UNITED STATES PATENT AND TRADEMARK OFFICE
CERTIFICATE OF CORRECTION

PATENT NO. : 9,232,033 B2
APPLICATION NO. : 14/185577
DATED : January 5, 2016
INVENTOR(S) : Anders Edvard Trell It is certified that error appears in the above-identified patent and that said Letters Patent is hereby corrected as shown below:

Claims

Column 4, line 66, claim 1: "hollows to facilitate a said mounting into the said" should read --at least one hollow to facilitate a said mounting into the said--

Column 5, line 41, claim 9: "hollows to facilitate a said mounting into the said" should read --at least one hollow to facilitate a said mounting into the said--

Column 6, lines 35-36, claim 17: "wherein the attachment means comprises gauge and hollows to facilitate attachment to the mobile telephone;" should read --wherein the attachment means comprises gauge and at least one hollow to facilitate attachment to the mobile telephone;--

Signed and Sealed this
Nineteenth Day of April, 2016

Michelle K. Lee
*Director of the United States Patent and Trademark Office*